United States Patent
Patel et al.

(10) Patent No.: US 8,873,962 B2
(45) Date of Patent: Oct. 28, 2014

(54) METHOD FOR TRAFFIC GROOMING, WAVELENGTH ASSIGNMENT AND SPECTRUM ALLOCATION

(75) Inventors: Ankitkumar N. Patel, East Brunswick, NJ (US); Philip Nan Ji, Princeton, NJ (US); Jason P. Jue, Plano, TX (US); Ting Wang, West Windsor, NJ (US); Yoshiaki Aono, Tokyo (JP)

(73) Assignee: NEC Laboratories America, Inc., Princeton, NJ (US)

(*) Notice: Subject to any disclaimer, the term of this patent is extended or adjusted under 35 U.S.C. 154(b) by 171 days.

(21) Appl. No.: 13/435,413

(22) Filed: Mar. 30, 2012

(65) Prior Publication Data

US 2012/0251117 A1    Oct. 4, 2012

Related U.S. Application Data

(60) Provisional application No. 61/469,279, filed on Mar. 30, 2011.

(51) Int. Cl.
*H04J 14/02* (2006.01)
*H04J 14/00* (2006.01)

(52) U.S. Cl.
CPC ......... *H04J 14/0224* (2013.01); *H04J 14/0267* (2013.01); *H04J 14/026* (2013.01); *H04J 14/0257* (2013.01)

USPC .............. 398/79; 398/48; 398/49; 398/50; 398/51; 398/82; 398/83

(58) Field of Classification Search
USPC .................... 398/43–103, 140–201
See application file for complete search history.

(56) References Cited

PUBLICATIONS

Jinno et al: "Spectrum-Efficient and Scalable Elastic Optical Path Network: Architecture, Benefits, and Enabling Technologies", IEEE Communications Magazine, Nov. 2009, pp. 66-73.*
Jinno et al: "Distance-Adaptive Spectrum Resource Allocation in Spectrum-Sliced Elastic Optical Path Network", IEEE Communications Magazine, Aug. 2010, pp. 138-145.*
Gringeri et al: "Flexible Architectures for Optical Transport Nodes and Networks", IEEE Communications Magazine, Jul. 2010, pp. 40-50.*
Christodoulopoulos et al: "Routing and Spectrum Allocation in OFDM-based Optical Networks with Elastic Bandwidth Allocation", Global Telecommunications Conference (GLOBECOM 2010), 2010, pp. 1-6.*

* cited by examiner

*Primary Examiner* — Li Liu
(74) *Attorney, Agent, or Firm* — Joseph Kolodka (57) ABSTRACT

A method includes determining a line rate selection for a flexible optical wavelength-division-multiplexing WDM network, determining a traffic routing in said network, and determining simultaneously a channel routing, wavelength assignment and spectrum allocation in said network based on an auxiliary graph.

12 Claims, 6 Drawing Sheets

Auxiliary Graph

FIG. 2A 4-node Network

METHOD FOR TRAFFIC GROOMING, WAVELENGTH ASSIGNMENT AND SPECTRUM ALLOCATION

RELATED APPLICATION INFORMATION

This application claims priority to provisional application Ser. No. 61/469,279 filed on Mar. 30, 2011, the contents thereof are incorporated herein by reference.

BACKGROUND

The present invention relates optical communications, and, more particularly, to a method for traffic grooming, wavelength assignment and spectrum allocation.

Figure 1:
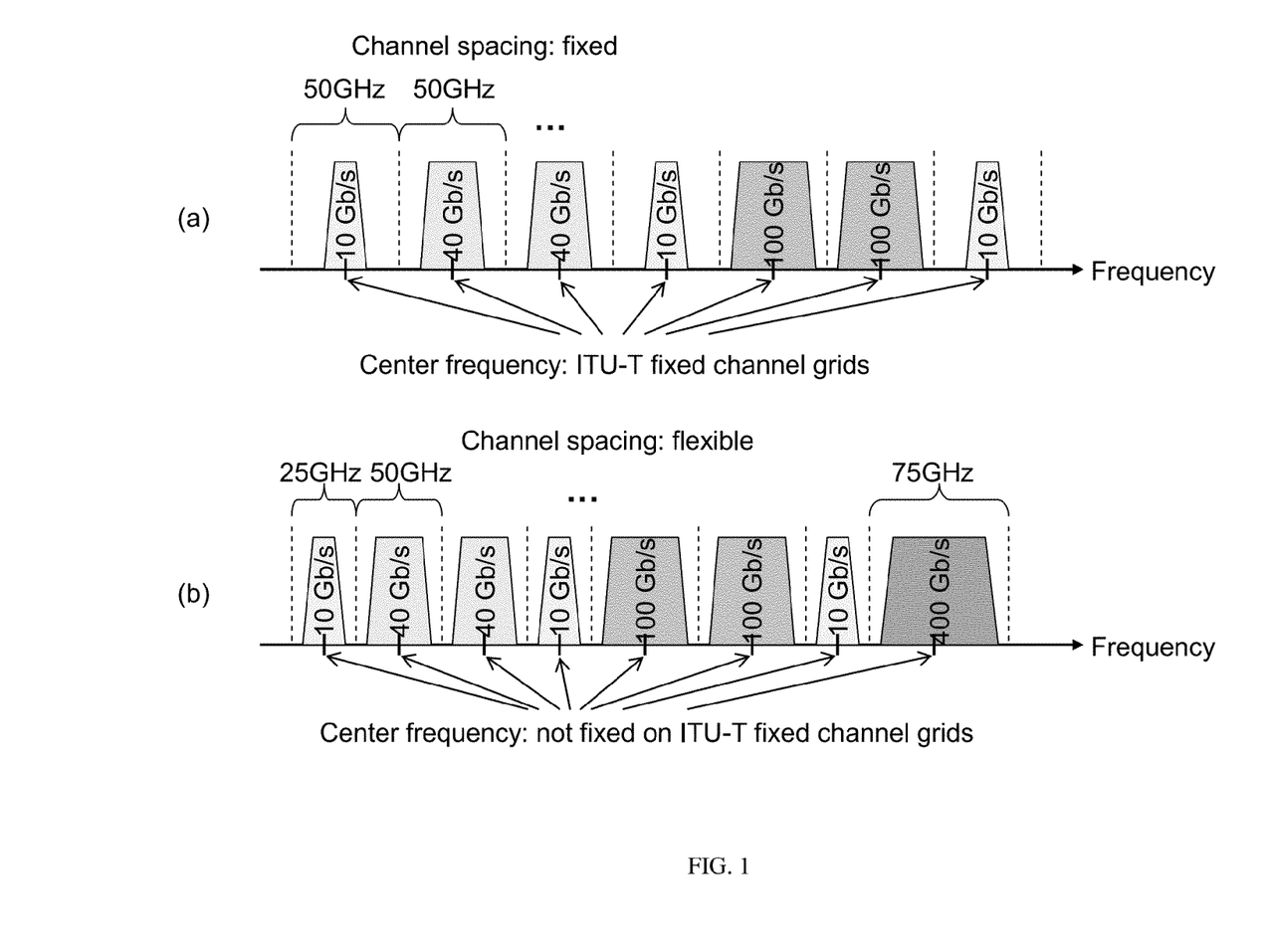
FIG. 1 is a diagram comparing (a) fixed grid WDM network and (b) a flexible WDM network.

In the ITU-T standardized fixed grid networks [ITU-T], fixed amount of spectrum (50 GHz) is allocated to every channel irrespective of the operating line rate, and the center frequency of a channel remains fixed (FIG. 1(a)). Such a fixed channel grid may not be sufficient to support immerging super-channels which operate at 400 Gb/s or 1 Tb/s line rates. For example, 50 GHz of spectrum is not sufficient for 400 Gb/s and 1 Tb/s channels which require 75 GHz [Y Huang] and 150 GHz [S Gringeri] of spectrum respectively. On the other hand, supporting such super-channels by increasing the channel spacing in fixed grid networks may not optimize the spectrum allocation for channels operating at lower line rates. For example, 10 Gills channel requires only 25 GHz of spectrum. Thus, no single fixed channel grid is optimal for all line rates.

There has been growing research on optical WDM systems that are not limited to fixed ITU-T channel grid, but offers flexible channel grid to increase spectral efficiency. We refer to such gridless WDM networks as Flexible Optical WDM Networks (FWDM). In FWDM networks, flexible amount of spectrum is allocated to each channel, and the channel center frequency may not be fixed (FIG. 1(b)). Thus, while establishing a channel in FWDM networks, control plane must follow (1) the requirement of having the same operating wavelength on all fibers along the route of a channel which is referred to as the wavelength continuity constraint, (2) the requirement of allocating the same amount of spectrum on all fibers along the route of a channel which is referred to as the spectral continuity constraint, and (3) the requirement of allocating non-overlapping spectrum with the neighboring channels in the fiber which is referred to as the spectral continuity constraint. The problem of finding a channel satisfying these constraints is referred to as the routing, wavelength assignment, and spectrum allocation (RWSA) problem.

FWDM networks remove the fixed channel grid restriction and allow non-uniform and dynamic allocation of spectrum. Channels with finer granularity line rates can be supported by using either Orthogonal Frequency Division Multiplexing (OFDM) modulation scheme with variable subcarrier assignment or single carrier modulation schemes with switchable modulation stages. Such channels are referred to as flexible channels in spite of flexible spectrum allocation, spectral utilization of existing channels is limited by the stranded channel capacity in FWDM networks that support discrete sets of line rates. Additionally, there is a requirement of allocating guard bands between channels in order to avoid interchannel interference. The total required spectrum for guard bands increases in proportion to the number of multiplexed channels in a fiber. For example, supporting 10 individual connections demanding 10 Gb/s line rates per connection using 10 of the 10 Gb/s flexible channels allocate 10 times more spectrum for guard bands compared to supporting the same amount of traffic using a single 100 Gb/s channels, and aggregating all connections in a single channel. An effective solution to improve the utilization of channels and to reduce the wasted spectrum in terms of guard bands is to aggregate low speed connections onto high capacity channels. Such functionality is referred to as traffic grooming. Thus, by packing low granularity of traffic into existing channels, traffic grooming improves the channels resource utilization, and by reducing the number of multiplexed channels in the fiber, traffic grooming improves the spectral utilization.

In traffic grooming, WDM signals at the incoming ports are first demultiplexed into individual wavelength channels using bandwidth variable demultiplexer. Channels carrying transit traffic are switched all-optically using an optical cross-connect (OXC). Low speed connections in wavelength channels are aggregated, separated, and switched by first converting input optical signals into electrical signals using variable rate transponders, performing grooming operations at the client layer using an electrical grooming fabric capable of TDM circuit switching or packet switching, and converting electrical signals back to optical signals using variable rate transponders.

One of the open problems in traffic grooming is: for a given configuration of the optical network in terms of the location of optical nodes and deployed fibers connecting optical nodes, a set of line rates offered by the network and respective spectrum requirement, and the required spectrum of a guard band, the problem is how to find channels and route connections over this channels such that minimum amount of spectrum is required to support the traffic. Finding channels in FWDM networks consists of the sub-problems such as how to determine the operating line rates of channels (line rate selection sub-problem), how to route traffic over channels (traffic routing sub-problem), how to route channels over the network (channel routing sub-problem), how to assign wavelengths to channels (wavelength assignment sub-problem), and how to allocate the required spectrum to channels (spectrum allocation sub-problem). Together the problem is referred to as the traffic grooming, routing, wavelength assignment, and spectrum allocation (GRWSA) problem in traffic grooming capable FWDM networks.

While establishing channels in traffic grooming capable FWDM networks, some additional constraints, such as (1) spectral continuity constraint, which is defined as the allocation of same amount of spectrum on all links along the route, and (2) spectral conflict constraint, which is defined as non-overlapping spectrum allocation to neighboring channels routed though the same fiber, must be maintained in addition to the conventional wavelength continuity constraint, which is defined as the allocation of the same wavelength on all links along the route of a channel.

The traffic grooming, routing, and wavelength assignment (GRWSA) problem in fixed grid networks has been studied in detail by others; however none of the proposed solutions in fixed grid networks is applicable to the GRWSA problem due to additional flexibility in selection of line rates of channels and allocation of spectral resources to channels in FWDM networks.

In a prior work, applicants address the RWSSA problem for optical-layer traffic grooming capable FWDM networks. The RWSSA problem is a special case of the GRWSA problem with additional constraints, such as subcarrier continuity constraint and different wavelengths constraint. The proposed solution in in this prior work by applicants is applicable to the GRWSA problem in FWDM networks that supports channels with only OFDM modulation scheme; however the proposed solution in [IR3] is not applicable to the GRWSA problem for the FWDM networks that supports channels with single carrier modulation schemes.

In another work, the authors simplify the GRWSA problem and formulate the problem as in Integer Linear Program (ILP). That proposed solution is not scalable for the large network size. Additionally, that proposed solution does not solve the wavelength assignment and the spectrum allocation subproblems. That proposed ILP is only applicable to networks that supports only OFDM modulation scheme.

Accordingly, there is a need for an efficient OFDM transceiver that overcomes the shortcomings of prior attempts.

SUMMARY OF THE INVENTION

A method includes determining a line rate selection for a flexible optical wavelength-division-multiplexing WDM network, determining a traffic routing in network, and determining simultaneously a channel routing, wavelength assignment and spectrum allocation in the network based on an auxiliary graph. In a (preferred embodiment, the routing traffic over channels in the network is done using a first fit channel selection for increasing a number of bypassed channels in a node in the network. Also, the auxiliary graph based approach for determining simultaneously the channel routing, wavelength assignment and spectrum allocation in the network enables greater optimization in the network compared to determining the channel routing, wavelength assignment and spectrum allocation sequentially.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to traffic grooming, routing, wavelength assignment, and spectrum allocation procedure for the GRWSA problem in flexible optical WDM networks. The problem analysis is divided into five parts: line rate selection sub-problem, traffic routing sub-problem, channel routing sub-problem, wavelength assignment sub-problem, and spectrum allocation sub-problem. The line rate selection and the traffic routing sub-problems are first solved sequentially, and then, the channel routing, wavelength assignment, and spectrum allocation sub-problems are solved at the same time using an auxiliary graph based approach. The inventive procedure is not only applicable for channels with an OFDM modulation format, but also applicable to channels with single carrier modulation formats.

Referring now in detail to the figures in which like numerals represent the same or similar elements and initially to FIG. 1, an exemplary optical grooming node 100 is shown. We are given the FWDM network configuration, denoted as G(V, E), where V is a set of optical nodes and E is a set of optical fibers connecting optical nodes. The total optical spectrum is Y GHz. The FWDM network can support a set of line rates L. A line rate l∈L requires $x_l$ GHz of spectrum. The required spectrum tier a guard band is M GHz. A set of traffic demands Δ in which a request us defined as R(s, d, r), where s is the source node, d is the destination node, and r is the requested data rate. We need to find channels, routing of traffic over these channels, routing of channels over physical topology, assignment of wavelengths to channels, and allocation of spectrum to channels, such that the required spectrum is minimized. We assume that traffic cannot be bifurcated, and optical network is ideal.

We first introduce some terminologies to explain the traffic grooming, routing, wavelength assignment, and spectrum allocation procedure. The spectrum is slotted in the frequency domain. Each slot is referred to as a wavelength slot. The spectral width of a wavelength slot is δ GHz. The index of a wavelength slot is denoted as $$w \in \left\{1, 2, 3, 4, ..., \left\lceil \frac{Y}{\delta} \right\rceil \right\}.$$

The spectrum can also be defined in terms of the number of consecutive wavelength slots. The lowest index of the allocated wavelength slots to a channel is referred to as the wavelength of a channel. In a fiber, a wavelength slot can either be in an occupied state or be in an available state. The state information of a wavelength slot w in a fiber (i, j)∈E is referred to as the spectrum availability profile which is denoted as $G^w_{ij} \in \{0,1\}$, where $G^w_{ij}=1$ indicates that a wavelength slot w is available on fiber (i, j), and $G^w_{ij}=0$ indicates that a wavelength slot w is occupied by some channel on fiber (i, j). A channel is an all-optical connection between end nodes established by reserving the same spectrum on all links connecting the end nodes, and a point-to-point channel is a segment of a channel on a single fiber. In the description of the procedure, the data rate and traffic terminologies are used interchangeably.

The procedure addresses the GRWSA problem by solving first the line rate selection and traffic routing sub-problems sequentially. The procedure first solves the line rate selection sub-problem which determines the number of point-to-point channels per link and their respective line rates. First, requests from the given set Δ, are routed on the physical topology G(V, E) in the descending order of the cost function C=r*$H_{sd}$ using load balanced routing approach, where $H_{sd}$ is the shortest physical distance between source s and destination d. The load balanced routing approach adaptively routes a request in such a way that the maximum routed traffic on a link $t_{ij}$ is minimized. The procedure first finds K-shortest paths, and determines maximum traffic on each path using the traffic $t_{ij}$ on each link along the path. At the end, a path is selected which minimizes this maximum traffic. In case of conflicts, a path is selected on which the second maximum traffic is minimized. The routing information of traffic from each request i is recorded in $P_i$. Giving higher priority in routing those requests with higher value of C minimizes the total required network resources by routing them on shortest available paths. On the other hand, giving lower priority to requests with lower value of C balances the network load while minimizing the total required network resources by routing them on longer paths. Thus, the required spectrum in the network minimizes by minimizing the maximum routed traffic on a link. In the next step, the procedure finds the maximum traffic $\gamma=\max_{(i,j)} t_{ij}$ on a link.

The total required spectrum for traffic n is denoted as $X_n$, the optimal set of line rates that support traffic n is denoted as $Y_n$, the line rate of a point-to-point channel to obtain the traffic n from the traffic $n-q_n$ is denoted as $q_n$, and the traffic from which the optimal solution of traffic n is obtained is denoted as $p_n$.

The procedure for selecting optimal set of line rates $Y_\gamma$ for the maximum traffic $\gamma$ is to recursively determine the spectrum and set of channels required for traffic n using the spectrum and set of channels required for the traffic n', where n'<n. If the optimal spectrum and set of point-to-point channels are known for each traffic n'<n, then the optimal spectrum for the traffic n can be obtained as follows.

$$X_n = 0 \text{ if } n \leq 0 \tag{1}$$

$$X_n = \min_{l \in L} [x_l + X_{n-l}] \text{ if } n > 0 \tag{2},$$

where n'=n-l. Suppose we are finding the solution for the traffic n, and we already obtained the optimal set of line rates for the traffic which are less than n. Let l'∈L is the line rate which results in the minimum spectrum using equation 2. The set of point-to-point channels for the traffic n is $Y_n = Y_{n-l'} \cup \{l'\}$. This procedure is repeated until n is equivalent to the maximum traffic $\gamma$. The found set of line rates $Y_\gamma$ is assigned to each link in the network. Each line rate represents a point-to-point channel, and each point-to-point channel is assigned a unique ID v in ascending order of the operating line rate $l^v$, where $1 \leq v \leq |Y_\gamma|$, and $l^v$ represents the line rate of a point-to-point channel v.

After determining the set of line rates, the procedure addresses the traffic routing sub-problem in which traffic is routed over the found point-to-point channels in the line rate selection sub-problem. For each request n from the ordered set $\Delta$, the requested traffic is allocated to point-to-point channels on a link along the route $P_n$, using the first fit channel selection approach in which residual capacity of a point-to-point channel with the lowest ID is first assigned to the traffic of a request on a link along the route $P_n$. While routing traffic over point-to-point channels, the procedure also records a set of requests $\alpha_{ij}^v$ routed through a point-to-point channel v on each link (i, j).

Key Aspect

After the traffic routing sub-problem is addressed, the procedure solves the channel routing, wavelength assignment, and subcarrier allocation sub-problems at the same time using an auxiliary graph based approach. The auxiliary graph $G^v(N, \theta)$ is constructed using point-to-point channels with ID v, where $1 \leq v \leq |Y_\gamma|$. A node x in the given graph G(V, E) is split into the number of auxiliary nodes equivalent to the number of degree of the node x, which are referred as ports of nodes. The auxiliary graph consists of two types of auxiliary links, wavelength links and switching links. A port in the auxiliary graph is denoted as $N_i^b$, where b∈Adj(i), and i, b∈V. Adj(i) is a set of adjacent nodes of node i. The edges in the layered graph are established based on routing information of requests through point-to-point channels on each link $\alpha_{ij}^v$ as follows.

Wavelength Link:

There is an edge between port $N_i^j$ and $N_j^i$, where i, j∈N, if some traffic is routed through a point-to-point channel v on an edge (i, j)∈E, $\exists n \in \alpha_{ij}^v$. otherwise $N_i^j$ and $N_j^i$ are disconnected.

Switching Link:

There is an edge between port $N_i^j$ and $N_i^k$, where j, i, k∈N, if traffic on an incoming point-to-point channel v, $\alpha_{ji}^v$, is the same as an outgoing point-to-point channel v, $\alpha_{ik}^v$, at node i (Bypassed traffic), otherwise $N_i^j$ and $N_i^k$ are disconnected.

Figure 2A:
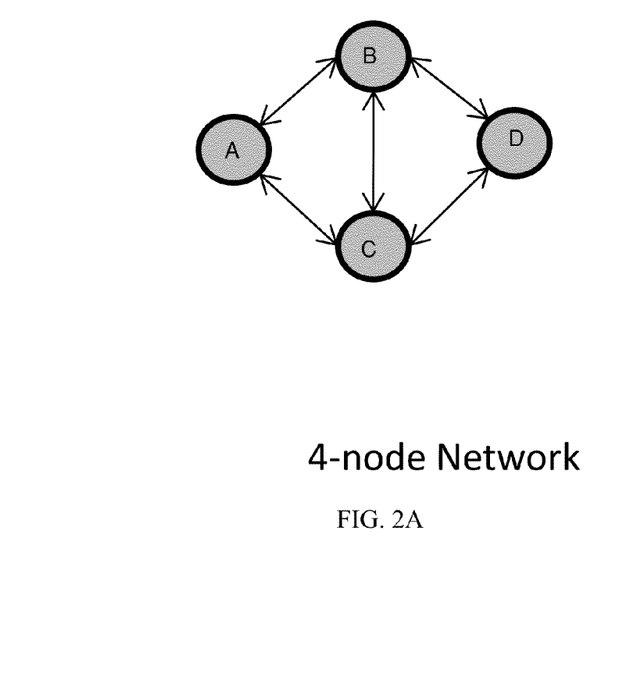
FIG. 2 is a depiction of (a) a 4-node network and (b) an Auxiliary graph.
Figure 2B:
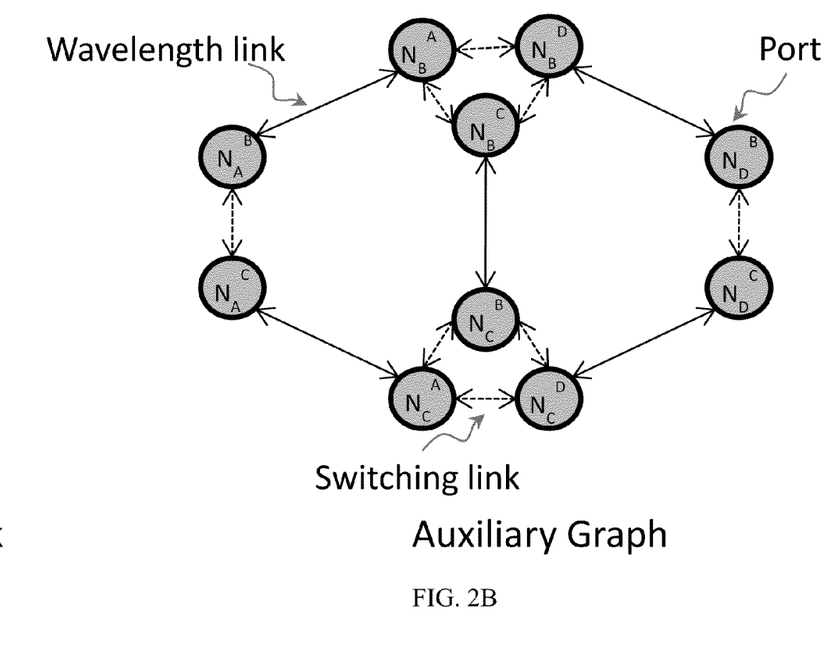

FIG. 2 demonstrates an auxiliary graph for the 4-node network topology shown in FIG. 1.

If a port $N_i^j$ is not connected to any switching link, then the port is considered as a potential end node of a channel and included in the set $\pi_{sd}$. Spectrum availability profile is only maintained for wavelength links that represents fibers in the given physical topology. In the next step, for each i∈$\pi_{sd}$ and j∈$\pi_{sd}$, the procedure solves the channel routing, wavelength assignment, and spectrum allocation sub-problems at the same time. Starting from the wavelength slot w=1, if $$\left\lceil \frac{x_l^v}{\delta} \right\rceil$$

wavelength slots, equivalent to the required spectrum by the line rate $l^v$ of a point-to-point channel v, is not available on a wavelength link, then the procedure removes the wavelength link from the auxiliary graph. After checking all wavelength links in the auxiliary graph, the procedure finds connectivity between node i and node j using Dijkstra's algorithm. If node i is connected with node j, then the procedure reserves the consecutive wavelength slots starting from the wavelength slot w on the found route. The found wavelength slots represent the spectrum of a channel, the wavelength slot w represents an operating wavelength of a channel, and a channel is routed over the found route connecting end nodes. If node i is not connected to node j, then the procedure increases the wavelength slot w, and repeat the same procedure to determine the connectivity. If wavelength slot $$w > \left\lceil \frac{\gamma}{\delta} \right\rceil,$$

then the procedure considers the next potential source-destination pairs from the sets $\pi_{sd}$. After considering all node pairs from the sets $\pi_{sd}$, the procedure follows the same procedure for the next channel v which is not yet considered. The process is repeated until all channels are taken into account. Once all channels are routed in the auxiliary graph, the maximum reserved wavelength slot in wavelength links represents the required spectrum for the network.

Figure 3:
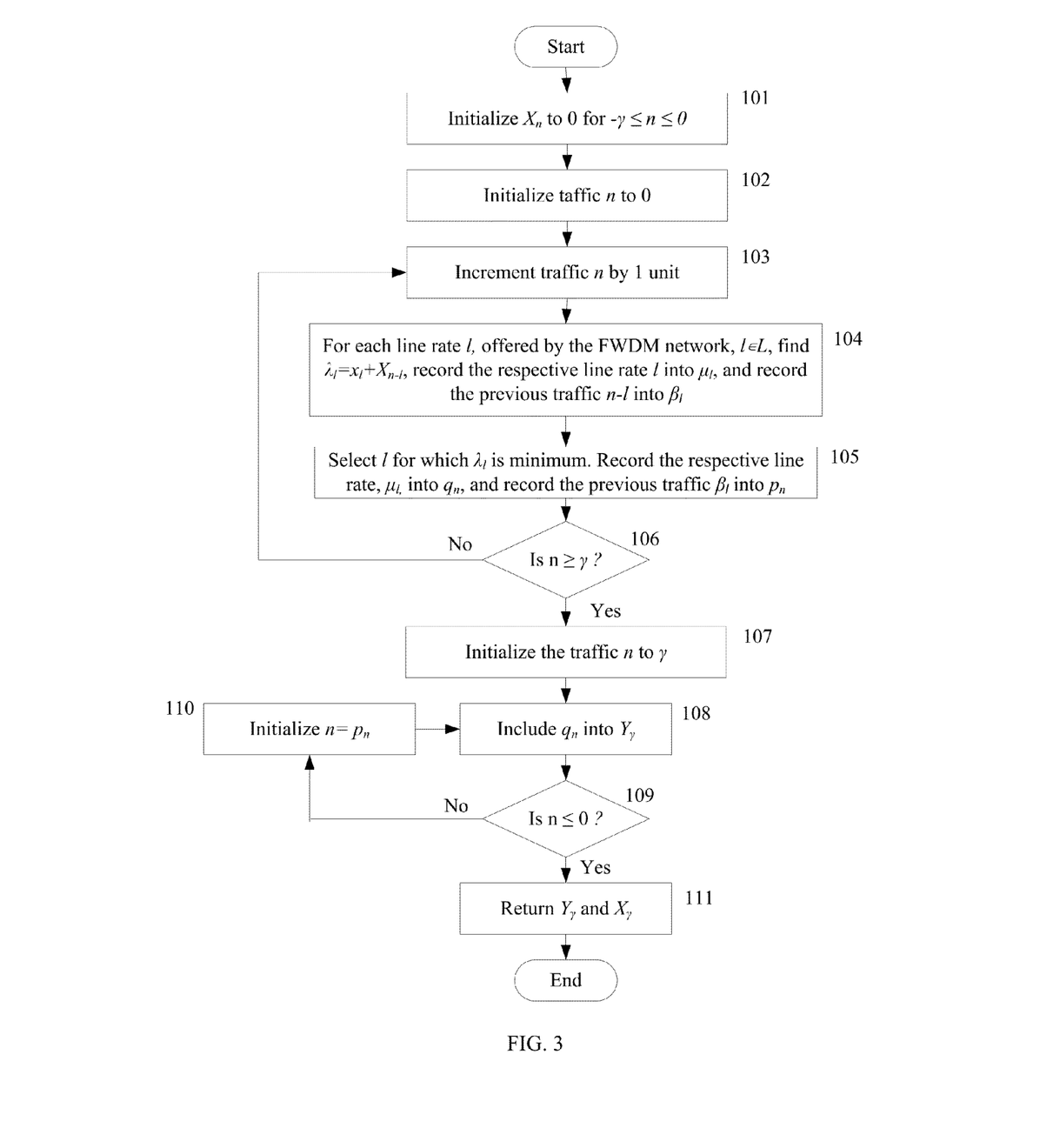
FIG. 3 is a flow chart of line rate selection procedure, in accordance with the invention.

Referring now to FIG. 3, there is illustrated a flowchart of the recursive procedure (Line Rate Selection Procedure) to find an optimal set of point-to-point channels and spectrum for the connection requesting traffic $\gamma$, which is explained in detail as follows.

The invention initializes, step 101, the required spectrum for traffic n to zero, if the traffic is in between $-\gamma$, and 0, which is equivalent to equation 1. Then the invention starts finding the optimal set of line rates and spectrum for the traffic n, see step 102. Since the n=0 is the base case, the optimal set of point-to-point channels is empty and the total spectrum is 0, from step 101. Then the traffic is incremented to n+1, see step 103. At the next step, 104, there is always positive traffic n, and the line rate, l∈L, is always positive, thus, at this step n-1 is always less than the n. We have already determined the optimal spectrum $X_{n'}$, and the set of line rates, $Y_{n'}$, for the traffic n', where n'<n, before reaching at this step. In this step, we find the spectrum, $\lambda_l$, which is the total spectrum of a set of line rates that consists of a line rate l. $\lambda_l$ can be determined by using the existing solution of traffic n-1. Thus, $\lambda_l = x_l + X_{n-l}$. We find $\lambda_l$ for all possible l within a set of line rates, L, offered by the FWDM networks. We also record the line rates into $\mu_l$ whose spectrum is taken into account in determining $\lambda_l$, and the previous traffic n−1 into $\beta_l$.

Next, at step 105, there is found the which result in minimum $\lambda_l$, and record the respective $\mu_l$ into $q_l$, and $\beta_l$ into $p_l$, $q_l$ and $p_l$ record the line rate and the previous traffic which results in minimum spectrum. Then at step 106, if the traffic n is still less than the traffic of a request, $\gamma$, then the invention repeats the steps 103, 104, and 105. If the traffic n is already equivalent or greater than the traffic of a request $\gamma$, then the invention follows step 107. At step 107, the invention initializes traffic n to the requested traffic of a request, $\gamma$. At step 108 the invention includes the line rate, $q_n$, into the optimum set of line rates $Y_\gamma$. At step 109, there is a check of whether the traffic n is less than or equal to 0. If the traffic n is positive, then step 110 is followed, otherwise step 111 is followed. At step 110, the invention reinitializes the traffic n to $p_n$, which is the previous traffic. At step 111, the invention returns the optimal set of line rates $Y_\gamma$ and the optimal spectrum, $X_\gamma$, and terminate the process.

Figure 4A:
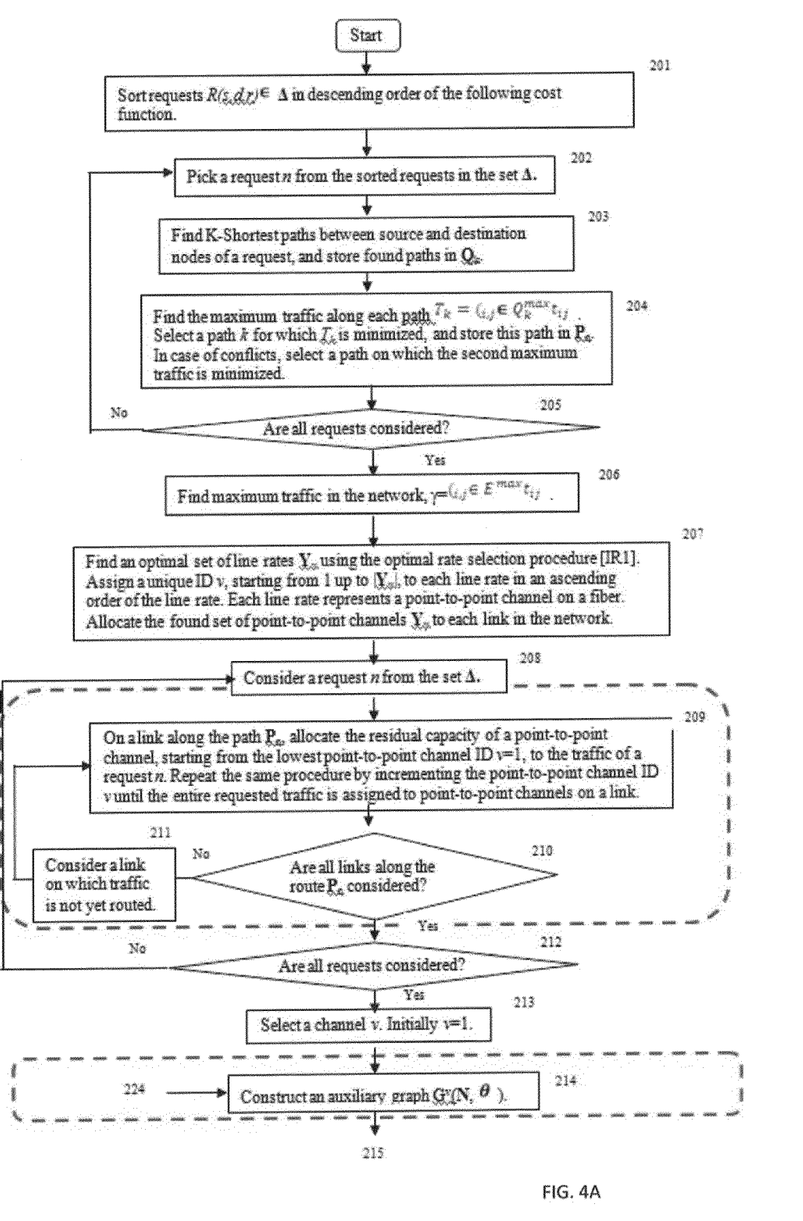
FIG. 4 is a flow chart of the traffic grooming, routing, wavelength assignment and spectrum allocation, in accordance with the invention.
Figure 4B:
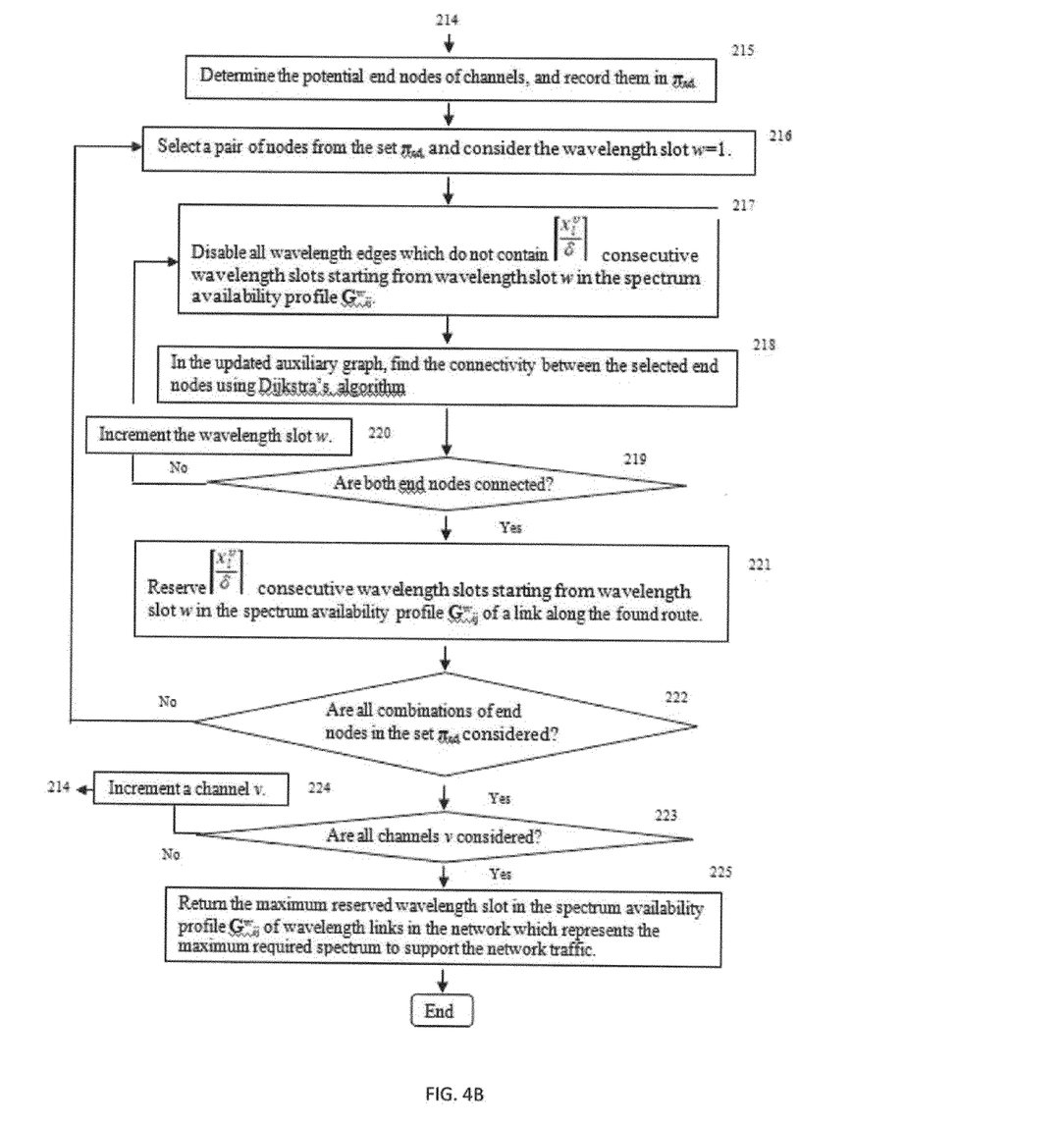

In FIG. 4, there is illustrated the flowchart of the traffic grooming, routing, wavelength assignment, and spectrum allocation procedure, and explained in detail as follows.

At step 201, requests in the given set $\Delta$ are arranged in descending order according to cost function C. Then at step 202, a request with the highest C value is selected. Then at step 203, for the selected request in Step 202, K-shortest paths are searched between source and destination nodes and each found path is recorded in the set $Q_k$. Followed by, at step 204, for each path k in step 203, the traffic on the maximum congested link is searched. Among k paths, a path with the minimum traffic on the maximum congested link is selected. In case of multiple such paths, a path with the minimum traffic on the second most congested link is selected. The selected path is recorded in the set $P_n$. A step 205, if all requests are routed, then the procedure follows step 206, otherwise the procedure follows step 202. At step 206, the traffic $\gamma$ on the most congested link in the network is searched. Followed by step 207, where for the traffic $\gamma$, optimal set of line rates $Y_\gamma$ are searched using the optimal rate selection procedure (FIG. 3). The found set of line rates are allocated to each link in the network. Each line rate on a link is referred to as a point-to-point channel. Each point-to-point channel on a fiber is assigned a unique ID v, starting from 1 up to $|Y_\gamma|$, in an ascending order of a line rate of the point-to-point channel.

In step 208, a request n is selected from the ordered set $\Delta$. In step 209, on a link along the path $P_n$, the residual capacity of a channel with the lowest ID v is assigned to the traffic of a request n. This process is repeated by incrementing the channel ID until all requested traffic is allocated to channels. At step 210, there is a check of whether all links along the path $P_n$ are considered or not. If traffic is routed on point-to-point channels of all links along the path $P_n$, then the procedure follows step 212, otherwise the procedure follows step 211. In step 211, the procedure considers a link on which the traffic is not yet assigned to channels.

In step 212, the procedure checks whether traffic of all requests are routed over point-to-point channels or not. If traffic of all requests are routed over point-to-point channels, then the procedure follows step 213, otherwise the procedure follows step 208. In step 213, the procedure selects point-to-point channels with ID v, where v is the lowest ID.

Then at step 14, an auxiliary graph $G^v(N, \theta)$ is constructed for the point to point channels with ID v.

At step 215, the procedure determines the potential set of end nodes $\pi_{sd}$ of channels based on the existence of the switching links in the auxiliary graph $G^v(N, \theta)$. At step 216, the procedure selects the lowest wavelength slot w=1 and a pair of end nodes form the set $\pi_{sd}$. At step 217, wavelength edges which do not contain $$\left\lceil \frac{x_l^\gamma}{\delta} \right\rceil$$

consecutive wavelength slots starting from the wavelength slot w in their spectrum availability profile $G^w_{ij}$ are disabled in the auxiliary graph. At step 218, the connectivity between the selected end nodes are searched using Dijkstra's algorithm in the updated auxiliary graph. At step 219, if the end nodes are connected, then the procedure follows step otherwise the procedure follows step 220. At step 220, the procedure increments the wavelength slot w and follows step 217. At step 221, the found path in step 218 is considered as a channel. The procedure reserves $$\left\lceil \frac{x_l^\gamma}{\delta} \right\rceil$$

wavelength slots starting from the wavelength slot w on the spectrum availability profile of each link along the found path in step 218. At step 222, the procedure checks whether all combinations of end nodes in the set $\pi_{sd}$ are taken into account. If all combinations of end nodes are already taken into account, then the procedure follows step 223, otherwise the procedure follows step 216. In step 223, the procedure checks whether all channel IDs are already taken into account. If all channel IDs are already considered, then the procedure follows step 225, otherwise the procedure follows step 224. In step 224, the procedure increments the channel ID v, and follows step 214. In the final step 225, the procedure returns the maximum reserved wavelength slot in the spectrum availability profile of wavelength links in the network.

From the foregoing it can be seen that the present invention provides a number of substantial benefits. The inventive procedure improves spectral efficiency of FWDM networks, so that the capacity per fiber can be increased. Even in WDM system using OFDM modulation schemes, the inventive procedure improves spectral efficiency of FWDM networks compared to the prior techniques or solutions. The inventive procedure is also faster than existing solutions. The inventive procedure decreases the connection blocking probability in FWDM networks. The inventive procedure provides a comprehensive solution to the GRWSA problem. The inventive procedure increases the traffic carrying capacity of networks.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method comprising a processor executing code to perform the steps of:
   i) determining a line rate selection for a flexible optical wavelength-division-multiplexing WDM network;
   ii) determining a traffic routing for said network; and iii) determining, responsive to the determined line rate selection and traffic routing, a channel routing, wavelength assignment and spectrum allocation in said network based on an auxiliary graph, the auxiliary graph $G^v(N, \theta)$ being constructed using point-to-point channels with identification v, where $1<=v<=|Y_\gamma|$, a node x in a given graph G(V, E) is split into a number of auxiliary nodes equivalent to the number of degree of the node x, which are referred to as ports of nodes, the auxiliary graph consisting of wavelength links and switching links, the auxiliary graph enabling a selection of nodes and links responsive to traffic requests from the network.

2. The method of claim 1, wherein said step ii) comprises routing traffic over channels in said network using a first fit channel selection for increasing a number of bypassed channels in a node in said network.

3. The method of claim 2, wherein a port in said auxiliary graph is denoted as $N_i^b$, where b∈Adj(i), and i, b∈V and Adj(i) is a set of adjacent nodes of node I, edges in a layered graph are established based on routing information of requests through point-to-point channels on each link $\alpha_{ij}^v$.

4. The method of claim 1, wherein said auxiliary graph based approach for determining simultaneously said step iii) comprises enabling greater optimization compared to determining said channel routing, wavelength assignment and spectrum allocation sequentially.

5. The method of claim 1, wherein said wavelength link comprises there being an edge between port $N_i^j$ and $N_j^i$, where i, j∈N, and if some traffic is routed through a point-to-point channel v on an edge (i, j)∈E, $\exists n \in \alpha_{ij}^v$, otherwise $N_i^j$ and $N_j^i$ are disconnected.

6. The method of claim 1, wherein said switching link comprises there being an edge between port $N_i^j$ and $N_i^k$, where j, i, k∈N, and if traffic on an incoming point-to-point channel v, $\alpha_{ji}^v$, is the same as an outgoing point-to-point channel v, $\alpha_{ik}^v$, at node i bypassed traffic, otherwise $N_i^j$ and $N_i^k$ are disconnected.

7. The method of claim 1, wherein said step i) determining a line rate selection comprises finding an optimal set of point-to-point channels and spectrum for a connection requesting traffic.

8. The method of claim 1, wherein said step iii) comprises on a link along a path, allocating a residual capacity of a point-to-point channel, starting from a lowest point-to-point channel, to the traffic of a request, and repeating said allocating by incrementing said point-to-point channel until an entire requested traffic is assigned to point-to-point channels on a link.

9. The method of claim 8, wherein if all links along a route have not been consider, said allocating considering a link on which traffic is not yet routed.

10. The method of claim 1, wherein for construction of said auxiliary graph is followed by a) determining potential nodes of channels which are recorded, b) selecting a pair of nodes from said recorded potential nodes of channels and considering a wavelength slot w, c) disabling all wavelength edges not containing consecutive wavelengths slots starting from a first wavelength slot in a spectrum availability profile, and d) in an updated auxiliary graph finding connectivity between selected end nodes.

11. The method of claim 10, wherein if both said end nodes are connected then consecutive wavelength slots are reserved starting from said wavelength w slot in a spectrum availability profile of a link along a found route.

12. A computer implemented method comprising the steps of:
   i) determining a line rate selection for a flexible optical wavelength-division-multiplexing WDM network;
   ii) determining a traffic routing for said network; and
   iii) determining, responsive to the determined line rate selection and traffic routing, a channel routing, wavelength assignment and spectrum allocation in said network based on an auxiliary graph, the auxiliary graph being constructed using point-to-point channels, where a node in a given graph is split into a number of auxiliary nodes equivalent to the number of degree of the node, which are referred to as ports of nodes, the auxiliary graph consisting of wavelength links and switching links the auxiliary graph enabling a selection of nodes and links responsive to traffic requests from the network; wherein for construction of said auxiliary graph is followed by:
   a) determining potential nodes of channels which are recorded,
   b) selecting a pair of nodes from said recorded potential nodes of channels and considering a wavelength slot,
   c) disabling all wavelength edges not containing consecutive wavelengths slots starting from a first wavelength slot in a spectrum availability profile, and
   d) in an updated auxiliary graph finding connectivity between selected end nodes.

* * * * *